US006365280B1

(12) United States Patent
Schlueter, Jr. et al.

(10) Patent No.: US 6,365,280 B1
(45) Date of Patent: Apr. 2, 2002

(54) NITRILE-SILICONE RUBBER SURFACE RELEASE LAYER FOR ELECTROSTATOGRAPHIC MEMBERS

(75) Inventors: Edward L. Schlueter, Jr., Rochester; Joseph Mammino, Penfield, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/722,507

(22) Filed: Nov. 28, 2000

(51) Int. Cl.[7] .......................... B32B 9/04; G03G 13/20

(52) U.S. Cl. ...................... 428/447; 430/124; 430/126; 399/328; 399/335; 399/339; 399/297; 399/308; 399/307

(58) Field of Search ........................ 428/447; 430/124, 430/126; 399/328, 335, 339, 297, 308, 307

(56) References Cited

U.S. PATENT DOCUMENTS

| | | | | |
|---|---|---|---|---|
| 3,634,077 A | * | 1/1972 | Sullivan | 430/125 |
| 4,123,472 A | | 10/1978 | Getson et al. | 260/827 |
| 4,150,181 A | | 4/1979 | Smith | 427/444 |
| 4,508,810 A | * | 4/1985 | Wartman | 430/201 |
| 4,711,818 A | | 12/1987 | Henry | 428/421 |
| 5,298,956 A | | 3/1994 | Mammino et al. | 355/275 |
| 5,464,703 A | | 11/1995 | Ferrar et al. | 428/421 |
| 5,563,202 A | | 10/1996 | Ferrar et al. | 524/430 |
| 5,846,643 A | | 12/1998 | Badesha et al. | 428/323 |
| 5,864,740 A | | 1/1999 | Heeks et al. | 399/325 |
| 5,991,590 A | | 11/1999 | Chang et al. | 399/302 |
| 6,037,092 A | | 3/2000 | Heeks et al. | 430/124 |

* cited by examiner

*Primary Examiner*—Mark Chapman
(74) *Attorney, Agent, or Firm*—Oliff & Berridge, PLC

(57) ABSTRACT

A member for use is a copying device includes at least a substrate and thereon a surface layer comprised of a nitrile-silicone rubber or elastomer. The nitrile-silicone rubber or elastomer provides superior resistance to swelling from solvents such as hydrocarbons found in many developer compositions. The member may have any form, including a belt, plate or drum configuration. The member may be used in the copying device as a fuser member, a pressure member, a transfer member or a transfix member.

19 Claims, 3 Drawing Sheets

NITRILE-SILICONE RUBBER SURFACE RELEASE LAYER FOR ELECTROSTATOGRAPHIC MEMBERS

BACKGROUND OF THE INVENTION

1. Field of the Invention

The present invention relates to electrostatographic members such as, for example, fuser, transfer and transfix members, having a surface release layer comprised of a nitrile-silicone rubber or elastomer.

2. Discussion of Related Art

In a typical electrostatographic reproducing apparatus such as an electrophotographic imaging system using a photoreceptor, a light image of an original to be copied is recorded in the form of an electrostatic latent image upon a photosensitive member and the latent image is subsequently rendered visible by the application of a developer containing colorants such as pigments or dyes. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member is then transferred either directly to an image receiving substrate such as paper or first to an intermediate transfer member and then to an image receiving substrate.

The toner particles may be transferred by heat and/or pressure to an intermediate transfer member, or more commonly, the toner particles may be electrostatically transferred to the intermediate transfer member by means of an electrical potential between the imaging member and the intermediate transfer member. After the toner has been transferred to the intermediate transfer member, it is then transferred to the image receiving substrate, for example by contacting the substrate with the toner image on the intermediate transfer member under heat and/or pressure.

Intermediate transfer members enable high throughput at modest process speeds. In four-color photocopier systems, the intermediate transfer member also improves registration of the final color toner image. In such systems, the four component colors of cyan, yellow, magenta and black may be synchronously developed onto one or more imaging members and transferred in registration onto an intermediate transfer member at a transfer station.

The toner particles in image configuration are ultimately transferred to the image receiving substrate. The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner to be bonded firmly to the support.

Several approaches to thermal fusing of toner images have been described. These methods include providing the application of heat and pressure substantially concurrently by various means, a roll pair maintained in pressure contact, a belt member in pressure contact with a roll, a belt member in pressure contact with a heater, and the like. Heat can be applied by heating one or both of the rolls, plate members, or belt members. Fusing of the toner particles occurs when the proper combination of heat, pressure, and/or contact for the optimum time period are provided. The balancing of these variables to bring about the fusing of the toner particles is well known in the art, and can be adjusted to suit particular machines or process conditions.

During the operation of one fusing system in which heat is applied to cause thermal fusing of the toner particles onto a support, both the toner image and the support are passed through a nip formed between a pair of rolls, plates, belts, or combination thereof. The concurrent transfer of heat and the application of pressure in the nip effects the fusing of the toner image onto the support.

It is important that the toner particles are able to have nearly complete transfer from any intermediate members used, and also not exhibit any transfer to fuser members (referred to as toner offset) used. To ensure these results, the surface layers of these members should be comprised of materials having low surface energies, have temperature stability and resistance, be insulative to semiconductive and be smooth.

Surface layers of these types of members in an electrostatographic device thus typically have comprised silicone rubber or fluoroelastomers as a preferred material. For example, conventional materials known in the art as useful for intermediate transfer member surfaces include silicone rubbers, fluorocarbon elastomers such as are available under the trademark VITON from E. I. du Pont de Nemours & Co., polyvinyl fluoride such as available under the tradename TEDLAR also available from E. I. du Pont de Nemours & Co, various fluoropolymers such as polytetrafluoroethylene (PTFE), perfluoroalkoxy (PFA-TEFLON), fluorinated ethylenepropylene copolymer (FEP), other TEFLON-like materials, and the like and mixtures thereof.

U.S. Pat. No. 6,037,092, incorporated herein by reference in its entirety, discloses a fuser member comprising a substrate and at least one layer thereover, the layer comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

U.S. Pat. No. 5,991,590, incorporated herein by reference in its entirety, describes a transfer member having a substrate, an outer silicone rubber layer, and a silicone polymer release agent material, wherein the release agent material is a polydimethyl siloxane cationic liquid emulsion.

U.S. Pat. No. 5,846,643 describes a fuser member for use in an electrostatographic printing machine has at least one layer of an elastomer composition comprising a silicone elastomer and a mica-type layered silicate, the silicone elastomer and mica-type layered silicate forming a delaminated nanocomposite with silicone elastomer inserted among the delaminated layers of the mica-type layered silicate.

U.S. Pat. No. 5,864,740 discloses a thermally stabilized silicone liquid composition and a toner fusing system using the thermally stabilized silicone liquid as a release agent, wherein the thermally stabilized silicone liquid contains a silicone liquid and a thermal stabilizer composition (including a reaction product from at least a polyorganosiloxane and a platinum metal compound (Group VIII compound) such as a ruthenium compound, excluding platinum).

U.S. Pat. No. 4,150,181 discloses a contact fuser assembly and method for preventing toner offset on a heated fuser member in an electrostatic reproducing apparatus which includes a base member coated with a solid, abrasion resistant material such as polyimide, poly(amide-imides), poly(imide-esters), polysulfones, and aromatic polyamides. The fuser member is coated with a thin layer of polysiloxane fluid containing low molecular weight fluorocarbon. Toner offset on the heated fuser member is prevented by applying the polysiloxane fluid containing fluorocarbon to the solid, abrasion resistant surface of the fuser member.

U.S. Pat. No. 4,711,818 discloses a thermally conductive dry release fuser member and fusing method for use in electrostatic reproducing machines without the application of a release agent. The fuser member comprises a base support member and a thin deformable layer of a composition coated thereon, the composition comprising the crosslinked product of a mixture of at least one addition curable vinyl terminated or vinyl pendant polyfluoroorganosiloxane, filler, heat stabilizer, a crosslinking agent, and a crosslinking catalyst.

U.S. Pat. Nos. 5,464,703 and 5,563,202 disclose a fuser member useful for heat fixing an electrographic toner to a substrate, a composition of matter, and its preparation method. The fuser member has a core and a base cushion layer overlying the core. The base cushion layer includes a crosslinked poly(dimethylsiloxanefluoroalkylsiloxane) elastomer that has tin oxide particles dispersed therein in a concentration of from 20 to 40 percent of the total volume of the base cushion layer.

Silicone rubbers are widely used in fusing subsystems, largely because they can be modified to optimum fusing properties. Desirable physical properties in fusing materials include thermal conductivity, hardness, and toughness. However, one disadvantage of using silicone rubbers is that silicone rubbers swell in various solvents and in silicone oils. In current release agent technology, silicone oils are commonly used, but because of the swelling of silicone rubber in the oil, it is often necessary to coat the silicone fuser rolls with a fluoropolymer. Fluorosilicones that will resist swelling and possess the preferred physical properties for fusing are also available, but fluorosilicones are unstable at high temperatures (for example, over 300° F.), can release hazardous materials, and also are an environmentally unfriendly material.

Accordingly, while known compositions and processes are suitable for their intended purposes, a need remains for improved materials with better solvent resistance. Further, a need remains for a fuser, pressure, transfer and/or transfix member surface layer that does not result in significant swelling of the outer layer of the member during operation. In particular, as presently employed silicone rubbers swell upon exposure to hydrocarbon liquids such as found in most liquid developers, which swelling adversely affects the operation and quality output from the device, a need remains for improved materials for these members.

SUMMARY OF THE INVENTION

It is one object of the present invention to develop a material for use as a surface release layer of an electrostatographic member that exhibits improved solvent and swelling resistance.

It is a further object of the present invention to develop a fuser, pressure, transfer and/or transfix member in which the surface layer of the member exhibits low surface energy, temperature stability and resistance, smoothness, appropriate electrical conductivity, long life and solvent and swelling resistance to hydrocarbons.

These and other objects are achieved herein by the present invention, which comprises a member for use in a copying device comprising at least a substrate and thereon a surface layer comprised of a nitrile-silicone rubber or elastomer. The member may have any form, including a belt, plate or drum configuration. The member may be used in the copying device as a fuser member, a pressure member, a transfer member or a transfix member. It can also be utilized in printer, xerography or direct marking applications.

DETAILED DESCRIPTION OF PREFERRED EMBODIMENTS

Figure 1:
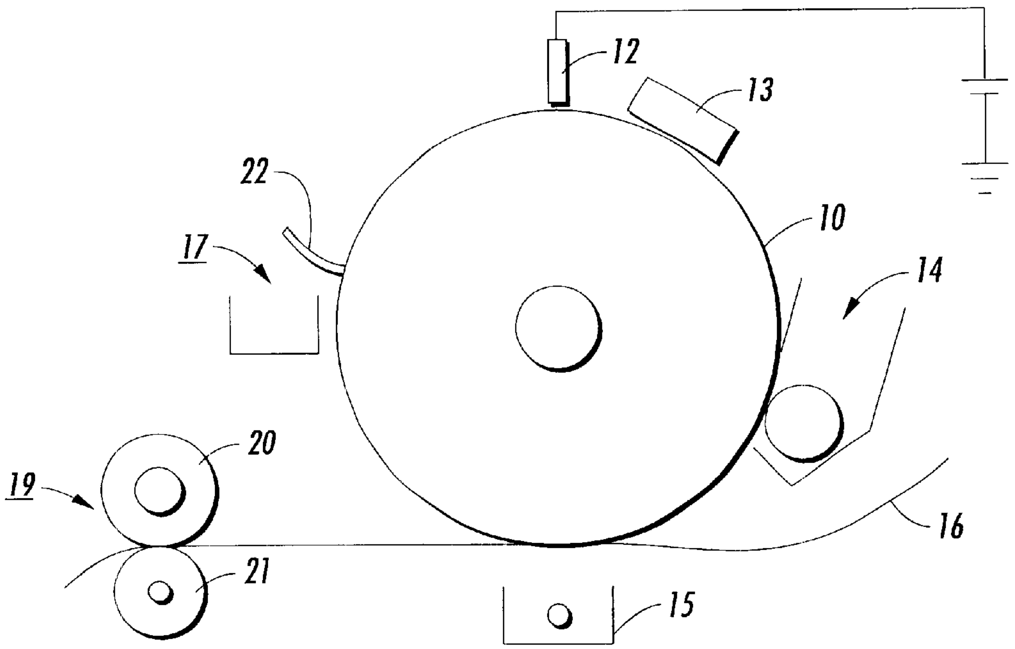
FIG. 1 is an illustration of a general electrostatographic apparatus.

The surface release layer of the members used in electrostatographic copying devices in the present invention is comprised of a nitrile-silicone rubber or elastomer. By "nitrile-silicone rubber or elastomer" as that term is used herein is meant broadly any type of silicone rubber or elastomer material into which nitrile groups have been chemically incorporated. For example, the nitrile groups may be incorporated into the rubber or elastomer chain as end groups.

Any suitable method may be undertaken in preparing the nitrile-silicone rubber or elastomer. See, for example, U.S. Pat. No. 4,123,472, incorporated herein by reference in its entirety, for one such method of deriving silicone elastomers containing nitrile groups.

Nitrile-silicone rubbers and elastomers are also commercially available. Moreover, as DuPont makes nitrile elastomers and Dow Corning, GE, and Wacker make silicones, chemical combinations of these commercial materials can also be utilized.

It has been found that in order to impart excellent resistance to swelling from solvents such as hydrocarbon liquids, the nitrile-silicone rubbers or elastomers preferably contain at least about 0.5 mole percent or more nitrile groups.

In a preferred embodiment of the present invention, the nitrile-silicone rubber or elastomer is prepared by replacing some of the methyl groups of a dimethylsilicone rubber material with cyano-alkyl groups such as cyano-ethyl, cyano-propyl, etc. This reaction can be carried out utilizing any suitable well-known type of reaction scheme. In this preferred embodiment, the nitrile-silicone rubber or elastomer has from about 5% to about 95% of the methyl groups replaced by nitrite groups, more preferably from about 5% to about 75% of the methyl groups replaced by nitrite groups.

It has surprisingly been found by the present inventors that the presence of the nitrite groups in the silicone rubber or elastomer yields a material with excellent release characteristics and superior swell resistance, and without having any of the health or environmental hazards associated with the use of fluoroelastomeric materials.

Another unexpected benefit of the nitrile-silicone rubbers and elastomers of the invention is that by controlling the content of the nitrile groups in the rubber or elastomer, the surface energy and swell resistance properties can be tailored for a given member and device. This is because as the nitrile group content increases, the resistance to swell increases, but the surface energy increases as well, thereby decreasing the extent of release. Thus, in applications where higher degrees of release are desired, less nitrile groups can be incorporated into the rubber or elastomer.

Further, the addition of the nitrile groups adds conductivity to the rubber or elastomer, rendering the material semiconductive. As such, the material has a resistivity suitable to assist in transfer of toner particles.

To have the desired properties of a release surface layer, including low surface energy and swelling resistance, the rubber or elastomer of the invention preferably has a number average molecular weight within the range of, for example, 25,000 to 400,000.

In addition, the rubber or elastomer preferably has a surface energy of less than about 30 dynes/cm, with lower surface energies being preferred, and a hardness of from about 10 to about 70 Shore A, preferably about 30 to about 50 Shore A, for conformability.

In preferred embodiments, the surface layer has a thickness of from about 0.5 mm to about 10 mm, although thicker or thinner surface layers may be used if appropriate, or if utilized as an overcoat.

Additional optional materials may also be included in the surface release material of the present invention. It is preferred that any fillers be substantially non-reactive with the material so that no adverse reaction occurs between the polymer material and the filler which would hinder curing or otherwise negatively affect the strength properties of the outer surface material.

For example, conductive or thermal conductive fillers may be dispersed in the layer. Other optional adjuvants and fillers that may be incorporated in the surface include, for example, thermal stabilizing agents, coloring agents, reinforcing fillers, processing aids, accelerators, and the like. Metal oxides, such as cupric oxide and/or zinc oxide, can also be used to improve release. Metal oxides, such as copper oxide, aluminum oxide, magnesium oxide, tin oxide, titanium oxide, iron oxide, zinc oxide, manganese oxide, molybdenum oxide, and the like, carbon black, graphite, metal to fibers and metal powder particles such as silver, nickel, aluminum, and the like, as well as mixtures thereof, can promote thermal conductivity. Inorganic particulate fillers can increase the abrasion resistance of the polymeric outer fusing layer.

Examples of such fillers include metal-containing fillers, such as a metal, metal alloy, metal oxide, metal salt, or other metal compound; the general classes of suitable metals include those metals of Groups 1b , 2a , 2b , 3a , 3b , 4a , 4b , 5a , 5b , 6b , 7b , 8, and the rare earth elements of the Periodic Table. Specific examples of such fillers are oxides of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel, and alloys thereof. Also suitable are reinforcing calcined alumina and non-reinforcing tabular alumina.

The nitrile-silicone rubbers or elastomers may be coated on the member substrate by any desired or suitable means, including by spraying, dipping, etc. A flow coating apparatus may also be used to flow coat a series of rolls. The rubber or elastomer, including with any fillers therein, may be diluted with a solvent, and particularly an environmentally friendly solvent, prior to application to the substrate.

Following coating, the rubber or elastomer is preferably crosslinked/cured.

For this, any suitable curing agents, crosslinking agents and/or catalysts may be included in the coating material. The curing can be carried out similar to that done for a silicone rubber or elastomer or fluoroelastomer, and thus need not be further explained here.

The members of the present invention, for example fuser members, transfer members and tranfix members, all of which are further described as to their respective functions below, may take any suitable form, including film form, belt form, roll form, plate form, etc. The term "member" as used herein is intended to refer to such members regardless of form. The term "fuser member" as used herein refers to fuser members including fusing rolls, belts, films, sheets, and the like; donor members, including donor rolls, belts, films, sheets, and the like; and pressure members, including pressure rolls, belts, films, sheets, and the like; and other members useful in the fusing system of an electrostatographic or xerographic, including digital, machine. The fuser members of the present invention can be employed in a wide variety of machines, and is not specifically limited in its application.

The members are comprised of at least a substrate and the overcoating of the surface release layer material of the invention. As the substrate, materials such as metals, plastics, rubbers and fabrics may be used.

In one preferred embodiment, the member is made of a hollow cylindrical metal core, such as copper, aluminum, stainless steel, or certain plastic materials chosen to maintain rigidity and structural integrity, as well as being capable of having a polymeric material coated thereon and adhered firmly thereto. The supporting substrate may be a cylindrical sleeve, preferably with an outer polymeric layer of from about 1 to about 6 millimeters.

Also suitable are quartz and glass substrates. The use of quartz or glass cores in members allows for a light weight, low cost system member to be produced. Moreover, the glass and quartz help allow for quick warm-up, and are therefore energy efficient and ideal for use in fuser members where heat is desired. In addition, because the core of the member comprises glass or quartz, there is a real possibility that such members can be recycled. Moreover, these cores allow for high thermal efficiency by providing superior insulation.

When the member is a belt, the substrate can be of any desired or suitable material, including plastics, such as Ultem, available from General Electric, Ultrapek, available from BASF, PPS (polyphenylene sulfide) sold under the tradenames Fortron, available from Hoechst Celanese, Ryton R-4, available from Phillips Petroleum, and Supec, available from General Electric; PAI (polyamide imide), sold under the tradename Torlon 7130, available from Amoco; polyketone (PK), sold under the tradename Kadel El 230, available from Amoco; PI (polyimide); polyaramide; PEEK (polyether ether ketone), sold under the tradename PEEK 450GL30, available from Victrex; polyphthalamide sold under the tradename Amodel, available from Amoco; PES (polyethersulfone); PEI (polyetherimide); PAEK (polyaryletherketone); PBA (polyparabanic acid); silicone resin; and fluorinated resin, such as PTFE (polytetrafluoroethylene); PFA (perfluoroalkoxy); FEP (fluorinated ethylene propylene); liquid crystalline resin (Xydar), available from Amoco; and the like, as well as mixtures thereof. These plastics can be filled with glass or other minerals to enhance their mechanical strength without changing their thermal properties. In preferred embodiments, the plastic comprises a high temperature plastic with superior mechanical strength, such as polyphenylene sulfide, polyamide imide, polyimide, polyketone, polyphthalamide, polyether ether ketone, polyethersulfone, and polyetherimide.

Suitable materials also include silicone rubbers. Suitable silicone rubbers include room temperature vulcanization (RTV) silicone rubbers, high temperature vulcanization (HTV) silicone rubbers, and low temperature vulcanization (LTV) silicone rubbers. These rubbers are known and are readily available commercially such as SILASTIC 735 black RTV and SILASTIC 732 RTV, both available from Dow Coming, and 106 RTV Silicone Rubber and 90 RTV Silicone Rubber, both available from General Electric. Other suitable silicone materials include the silanes, siloxanes (preferably polydimethylsiloxanes), such as fluorosilicones, dimethylsilicones, liquid silicone rubbers, such as vinyl crosslinked heat curable rubbers or silanol room temperature crosslinked materials, and the like.

Fabric materials may also be used as a substrate material. Fabrics are materials made from fibers or threads and woven, knitted or pressed into a cloth or felt type structures. Woven, as used herein, refers to closely oriented by warp and filler strands at right angles to each other. Nonwoven, as used herein, refers to randomly integrated fibers or filaments. The fabric material useful as the substrate herein must be suitable for allowing a high operating temperature (i.e., greater than about 180° C., preferably greater than 200° C.), capable of exhibiting high mechanical strength, providing heat insulating properties (this, in turn, improves the thermal efficiency of a fusing system), and possessing electrical insulating properties. In addition, it is preferred that the fabric substrate have a flexural strength of from about 2,000,000 to about 3,000,000 psi, and a flexural modulus of from about 25,000 to about 55,000 psi. Examples of suitable fabrics include woven or nonwoven cotton fabric, graphite fabric, fiberglass, woven or nonwoven polyimide for example KEVLAR (available from DuPont), woven or nonwoven polyamide, such as nylon or polyphenylene isophthalamide (for example, NOMEX of E. L. DuPont of Wilmington, Del.), polyester, polycarbonate, polyacryl, polystyrene, polyethylene, polypropylene, and the like.

One or more other optional intermediate layers, such as adhesive layers or other suitable cushion layers or conductive layers, can also be incorporated between the outer surface release layer and the substrate. Optional intermediate adhesive layers and/or polymer layers can be applied to achieve desired properties and performance objectives. An adhesive intermediate layer can be selected from, for example, epoxy resins and polysiloxanes. Preferred adhesives include materials such as Union Carbide A- 1100, Dow TACTIX 740, Dow TACTIX 741, Dow TACTIX 742, Dow Corning P5200, Dow Corning S-2260, Union Carbide A-1100, and United Chemical Technologies A0728. A particularly preferred curative for the aforementioned adhesives is Dow H41. Preferred adhesive(s) for adhesion are A4040 silane, available from Dow Coming Corp., Dow Coming 1200, also available from Dow Coming, and S-11 silane, available from Grace Specialty Polymers.

Other materials suitable for intermediate layers include polyimides, silicone rubbers and fluoroelastomers, including those commonly used as fuser or transfer member outer layers. As silicone rubber materials can swell as discussed above, aluminum oxide may be added in a relatively small amount to the material to reduce the swell and increase the transmissibility of heat. This increase in heat transmissibility is preferred in fusing members. In addition to the aluminum oxide, other metal oxides and/or metal hydroxides can be used. Such metal oxides and/or metal hydroxides include tin oxide, zinc oxide, calcium hydroxide, magnesium oxide, lead oxide, chromium oxide, copper oxide, and the like, as well as mixtures thereof The optional intermediate layers typically have a thickness of from about 0.05 to about 10 millimeters, preferably from about 0.1 to about 5 millimeters, and more preferably from about 1 to about 3 millimeters, although the thickness can be outside of these ranges.

Referring to FIG. 1, in a typical electrostatographic reproducing apparatus, a light image of an original to be copied is recorded in the form of an electrostatic latent image on a photosensitive member, and the latent image is subsequently rendered visible by the application of thermoplastic resin particles, commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface in image configuration, they are transferred to a copy sheet 16 by transfer means 15, which can be pressure transfer, electrostatic transfer, or the like. Alternatively, the developed image can be transferred to an intermediate transfer member and subsequently transferred to a copy sheet as explained below.

After transfer of the developed image to the image receiving substrate, copy sheet 16 advances to fusing station 19, depicted in FIG. 1 as fusing and pressure members (rolls), wherein the developed image is fused to copy sheet 16 by passing copy sheet 16 between fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
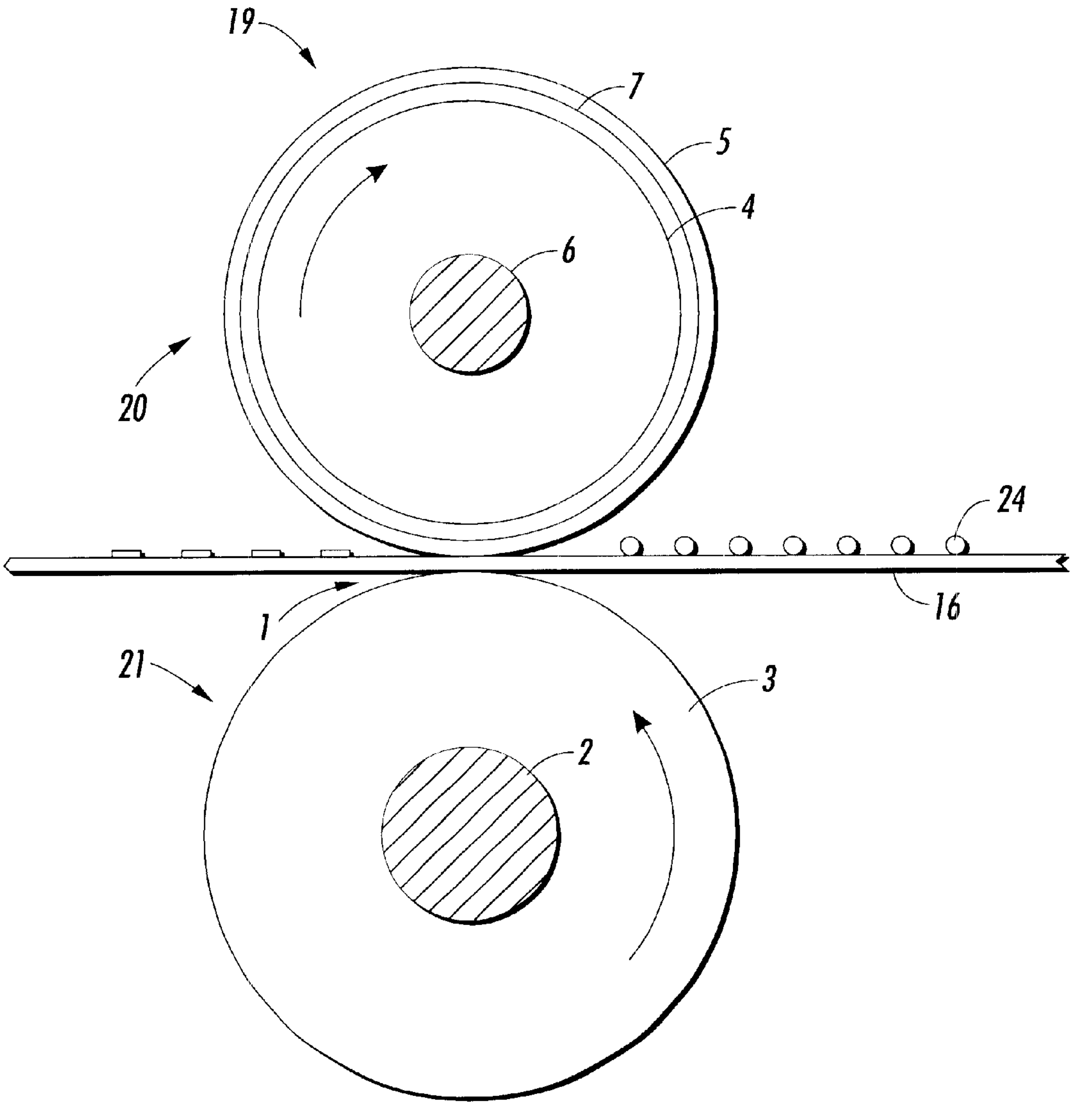
FIG. 2 illustrates a fusing system in accordance with an embodiment of the present invention.

Referring to FIG. 2, an embodiment of a fusing station 19 is depicted with an embodiment of a fuser roll 20 comprising nitrile-silicone rubber or elastomer surface 5 on a suitable base member or substrate 4, which may have a suitable heating element 6 disposed in the hollow portion thereof which is coextensive with the cylinder. The fuser member 20 optionally can include an adhesive, cushion, or other suitable layer 7 positioned between core 4 and outer layer 5. Backup or pressure roll 21 cooperates with fuser roll 20 to form a nip or contact arc I through which a copy paper or other substrate 16 passes such that toner images 24 thereon contact polymer or elastomer surface 5 of fuser roll 20. As shown in FIG. 2, an embodiment of a backup roll or pressure roll 21 is depicted as having a rigid steel core 2 with a polymer or elastomer surface or layer 3 thereon. The pressure member 21 can also optionally include a heating element (not shown).

If an intermediate transfer member is employed, the developed image is transferred from the imaging member to an intermediate transfer member. The image can be either a single image or a multi-image. In a multi-image system, each of the images may be formed on the imaging member and developed sequentially and then transferred to the intermediate transfer member, or in an alternative method, each image may be formed on the imaging member, developed, and transferred in registration to the intermediate transfer member.

The transfer members of the instant invention may be employed in either an image on image transfer or a tandem transfer of a toned image(s) from the photoreceptor to the intermediate transfer component, or in a transfix system for simultaneous transfer and fusing the transferred and developed latent image to the copy substrate. In an image on image transfer, the color toner images are first deposited on the photoreceptor and all the color toner images are then transferred simultaneously to the intermediate transfer component. In a tandem transfer, the toner image is transferred one color at a time from the photoreceptor to the same area of the intermediate transfer component.

Transfer of the developed image from the imaging member to the intermediate transfer element and transfer of the image from the intermediate transfer element to the substrate can be by any suitable technique conventionally used in electrophotography, such as corona transfer, pressure transfer, bias transfer, and combinations of those transfer means, and the like. In the situation of transfer from the intermediate transfer medium to the substrate, transfer methods such as adhesive transfer, wherein the receiving substrate has adhesive characteristics with respect to the developer material, can also be employed. Typical corona transfer entails contacting the deposited toner particles with the substrate and applying an electrostatic charge on the surface of the substrate opposite to the toner particles. A single wire corotron having applied thereto a potential of between about 5,000 and about 8,000 volts provides satisfactory transfer. In a specific process, a corona generating device sprays the back side of the image receiving member with ions to charge it to the proper potential so that it is tacked to the member from which the image is to be transferred and the toner powder image is attracted from the image bearing member to the image receiving member. After transfer, a corona generator charges the receiving member to an opposite polarity to detach the receiving member from the member that originally bore the developed image, whereupon the image receiving member is separated from the member that originally bore the image.

For color imaging, typically, four image forming devices are used. The image forming devices may each comprise an image receiving member in the form of a photoreceptor of other image receiving member. The intermediate transfer member of an embodiment of the present invention is supported for movement in an endless path such that incremental portions thereof move past the image forming components for transfer of an image from each of the image receiving members. Each image forming component is positioned adjacent the intermediate transfer member for enabling sequential transfer of different color toner images to the intermediate transfer member in superimposed registration with one another.

The transfer member moves such that each incremental portion thereof first moves past an image forming component and comes into contact with a developed color image on an image receiving member. A transfer device, which can comprise a corona discharge device, serves to effect transfer of the color component of the image at the area of contact between the receiving member and the intermediate transfer member. In a like fashion, image components of colors such as red, blue, brown, green, orange, magenta, cyan, yellow and black, corresponding to the original document also can be formed on the intermediate transfer member one color on top of the other to produce a full color image.

A transfer sheet or copy sheet is moved into contact with the toner image on the intermediate transfer member. A bias transfer member may be used to provide good contact between the sheet and the toner image at the transfer station. A corona transfer device also can be provided for assisting the bias transfer member in effecting image transfer. These imaging steps can occur simultaneously at different incremental portions of the intermediate transfer member. Further details of the transfer method employed herein are set forth in U.S. Pat. No. 5,298,956 to Mammino, the disclosure of which is hereby incorporated by reference in its entirety.

Figure 3:
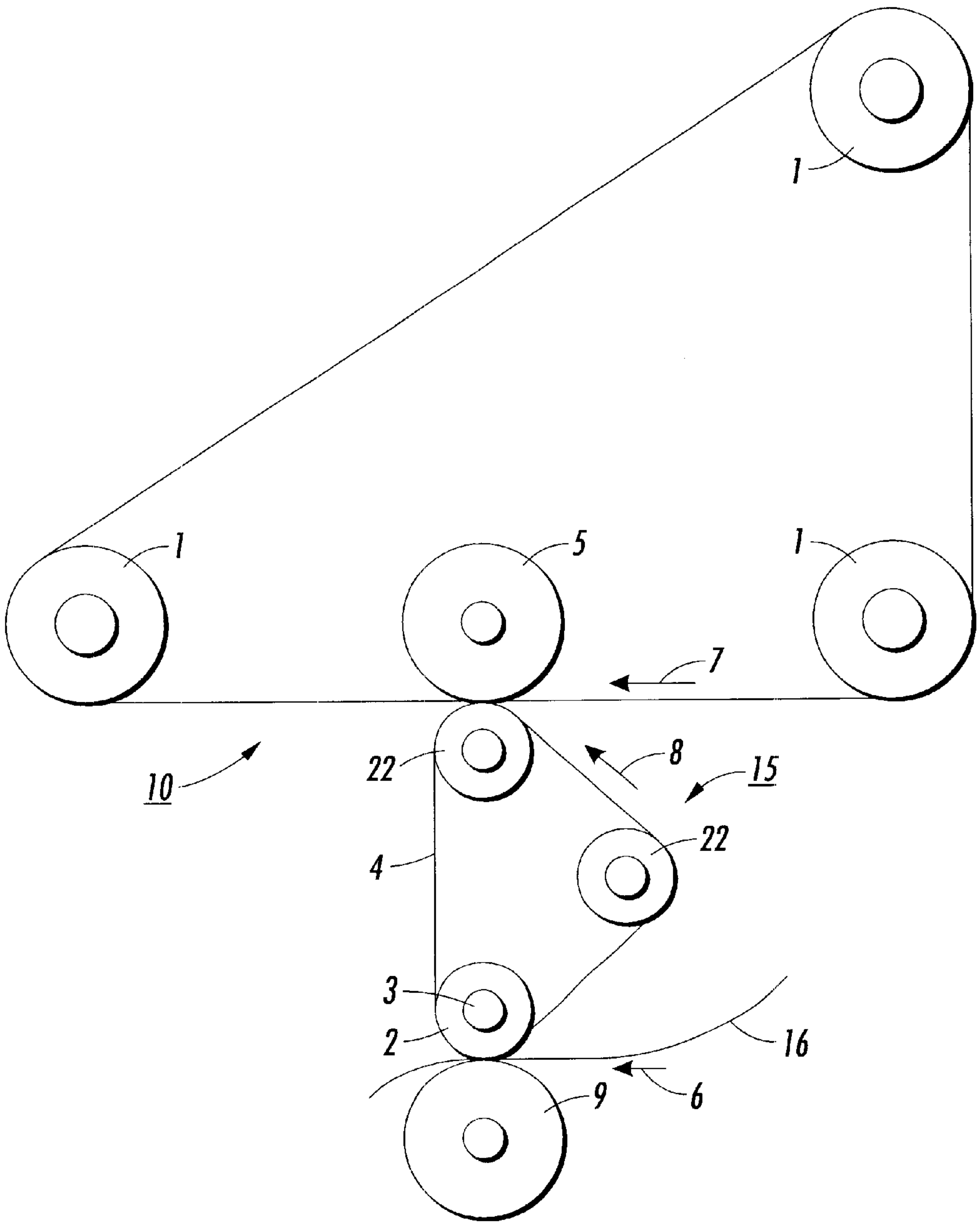
FIG. 3 is an illustration of an embodiment of the present invention, and represents a transfix member.

Transfer and fusing may occur simultaneously in a transfix configuration. As shown in FIG. 3, a transfer apparatus 15 is depicted as transfix belt 4 being held in position by driver rollers 22 and heated roller 2. Heated roller 2 comprises a heater element 3. Transfix belt 4 is driven by driving rollers 22 in the direction of arrow 8. The developed image from photoreceptor 10 (which is driven in direction 7 by rollers 1) is transferred to transfix belt 4 when contact with photoreceptor 10 and belt 4 occurs. Pressure roller 5 aids in transfer of the developed image from photoreceptor 10 to transfix belt 4. The transferred image is subsequently transferred to copy substrate 16 and simultaneously fixed to copy substrate 16 by passing the copy substrate 16 between belt 4 (containing the developed image) and pressure roller 9. A nip is formed by heated roller 2 with heating element 3 contained therein and pressure roller 9. Copy substrate 16 passes through the nip formed by heated roller 2 and pressure roller 9, and simultaneous transfer and fusing of the developed image to the copy substrate 16 occurs.

The present invention thus achieves a more solvent resistant silicone elastomer or rubber. Conventional silicones typically swell 10–30% in silicone oils depending on the elastomer crosslinking and the viscosity of the release agent. The nitrile rubbers of the invention, however, swell <10% depending on the polar nitrile content (i.e., the greater the nitrile content, the greater the swell resistance).

Although the invention has been described with reference to specific preferred embodiments, it is not intended to be limited thereto. Rather, those having ordinary skill in the art will recognize that variations and modifications may be made therein which are within the spirit of the invention and within the scope of the claims.

What is claimed is:

1. A member for use in a copying device comprising at least a substrate and thereon a surface layer having solvent resistance comprised of a nitrile-silicone rubber or elastomer, and wherein the nitrile-silicone rubber or elastomer has a surface energy of less than about 30 dynes/cm and a hardness of from about 10 to about 70 Shore A.

2. The member according to claim 1, wherein the substrate is a metal, plastic or fabric.

3. The member according to claim 1, wherein the member has a film, belt, plate or roll configuration.

4. The member according to claim 1, wherein the nitrile-silicone rubber contains about 0.5 mole percent or more nitrile groups.

5. The member according to claim 1, wherein the nitrile-silicone rubber or elastomer is a dimethylsilicone rubber or elastomer in which from about 5% to about 95% of the methyl groups are replaced by nitrile groups.

6. The member according to claim 5, wherein the nitrile-silicone rubber or elastomer is a dimethylsilicone rubber or elastomer in which from about 5% to about 75% of the methyl groups are replaced by nitrile groups.

7. The member according to claim 1, wherein the member further comprises one or more intermediate layers between the substrate and the surface layer.

8. The member according to claim 7, wherein the one or more intermediate layers are comprised of epoxy resins, polysiloxanes, polyimides, silicone rubbers or fluoroelastomers.

9. The member according to claim 1, wherein the one or more intermediate layers have a thickness of from about 0.05 to about 10 millimeters.

10. The member according to claim 1, wherein the surface layer further contains one or more additives selected from the group consisting of electrically conductive fillers, thermally conductive fillers, thermal stabilizing agents, coloring agents, reinforcing fillers and processing aids.

11. The member according to claim 1, wherein the surface layer has a thickness of from about 0.5 mm to about 10 mm.

12. The member according to claim 1, wherein the member is a fuser member.

13. The member according to claim 1, wherein the member is a pressure member.

14. The member according to claim 1, wherein the member is a transfer member.

15. The member according to claim 1, wherein the member is a transfix member.

16. A device containing the member according to claim 1, wherein the device is a xerographic device, a printer or a direct marking device.

17. A member for use in a copying device comprising at least a substrate and thereon a surface layer comprised of a nitrile-silicone rubber or elastomer, wherein the nitrile-silicone rubber or elastomer is a dimethylsilicone rubber or elastomer in which from about 5% to about 95% of the methyl groups are replaced by nitrite groups.

18. The member according to claim 17, wherein the surface layer has solvent resistance.

19. The member according to claim 17, wherein nitrile-silicone rubber or elastomer is a dimethylsilicone rubber or elastomer in which from about 5% to about 75% of the methyl groups are replaced by nitrile groups.

* * * * *